(12) United States Patent
Ito et al.

(10) Patent No.: US 9,032,438 B2
(45) Date of Patent: May 12, 2015

(54) METHOD AND APPARATUS FOR ACCESSING CONTENT

(75) Inventors: Tamotsu Ito, Tokyo (JP); Noriaki Harada, Tokyo (JP); Tsugutaro Ozawa, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 1547 days.

(21) Appl. No.: 11/016,161

(22) Filed: Dec. 16, 2004

(65) Prior Publication Data

US 2005/0111829 A1 May 26, 2005

Related U.S. Application Data

(63) Continuation of application No. 09/644,198, filed on Aug. 22, 2000.

(30) Foreign Application Priority Data

Dec. 28, 1999 (JP) .................................. 11-372672

(51) Int. Cl.
*H04N 7/173* (2011.01)
*G06F 3/00* (2006.01)
(Continued)

(52) U.S. Cl.
CPC .............. *H04N 1/2175* (2013.01); *G11B 19/02* (2013.01); *G11B 27/007* (2013.01); *G11B 27/034* (2013.01); *G11B 27/105* (2013.01);
(Continued)

(58) Field of Classification Search
CPC ............ H04N 21/4325; H04N 21/431; H04N 21/432; H04N 5/45; H04N 21/440236; H04N 21/440272; H04N 21/44591

USPC .............. 348/564, 565, 423.1; 715/718, 766, 715/838, 835; 725/78, 44; 386/46

See application file for complete search history.

(56) References Cited

U.S. PATENT DOCUMENTS 5,334,994 A * 8/1994 Takagi ........................... 345/667
5,539,871 A 7/1996 Gibson
(Continued)

FOREIGN PATENT DOCUMENTS

| JP | 08-079708 A | 3/1996 |
| JP | 09-093588 A | 4/1997 |

(Continued)

OTHER PUBLICATIONS

Japan Patent Office (JPO) office action dated Apr. 21, 2009 for JPO patent application JP2008-029874.
(Continued)

*Primary Examiner* — Pankaj Kumar
*Assistant Examiner* — Reuben M Brown
(74) *Attorney, Agent, or Firm* — Kilpatrick Townsend & Stockton LLP

(57) ABSTRACT

A method and apparatus for accessing content is capable of retrieving and selecting information is facilitated by using uniform operations. Symbols corresponding to pre-recorded programs contained on a recording medium are displayed on a screen. In response to selecting one of the symbols, representative frames comprising the program are displayed on the screen. In response to selecting a representative frame, a portion of the program is played back. In a recording device, content is accessed by displaying a representative frame from each of a number of user-defined streams. At least a portion of a stream is played back in response to selection of the corresponding one of the representative frames.

3 Claims, 16 Drawing Sheets

(51) Int. Cl.

| | | |
|---|---|---|
| *H04N 5/45* | (2011.01) | |
| *H04N 1/21* | (2006.01) | |
| *G11B 19/02* | (2006.01) | |
| *G11B 27/00* | (2006.01) | |
| *G11B 27/034* | (2006.01) | |
| *G11B 27/10* | (2006.01) | |
| *G11B 27/11* | (2006.01) | |
| *G11B 27/32* | (2006.01) | |
| *G11B 27/34* | (2006.01) | |
| *H04N 5/783* | (2006.01) | |
| *H04N 21/422* | (2011.01) | |
| *H04N 21/431* | (2011.01) | |
| *H04N 21/47* | (2011.01) | |

(52) U.S. Cl.
CPC ............ *G11B 27/11* (2013.01); *G11B 27/326* (2013.01); *G11B 27/329* (2013.01); *G11B 27/34* (2013.01); *G11B 2220/2562* (2013.01); *G11B 2220/65* (2013.01); *H04N 21/42204* (2013.01); *H04N 21/4316* (2013.01); *H04N 21/47* (2013.01)

(56) References Cited

U.S. PATENT DOCUMENTS

| | | | |
|---|---|---|---|
| 5,544,354 A | 8/1996 | May et al. | |
| 5,590,265 A | 12/1996 | Nakazawa | |
| 5,638,130 A * | 6/1997 | Linzer | 348/445 |
| 5,701,385 A | 12/1997 | Katsuyama et al. | |
| 5,717,816 A | 2/1998 | Boyce et al. | |
| 5,732,067 A | 3/1998 | Aotake | |
| 5,758,126 A | 5/1998 | Daniels et al. | |
| 5,815,145 A | 9/1998 | Matthews | |
| 5,818,439 A | 10/1998 | Nagasaka et al. | |
| 5,822,014 A | 10/1998 | Steyer et al. | |
| 5,892,511 A | 4/1999 | Gelsinger et al. | |
| 5,900,868 A * | 5/1999 | Duhault et al. | 725/42 |
| 6,020,930 A | 2/2000 | Legrand | |
| 6,031,960 A | 2/2000 | Lane et al. | |
| 6,072,489 A | 6/2000 | Gough et al. | |
| 6,101,498 A * | 8/2000 | Scaer et al. | 707/10 |
| 6,118,925 A | 9/2000 | Murata et al. | |
| 6,141,004 A | 10/2000 | Jeong | |
| 6,147,703 A | 11/2000 | Miller et al. | |
| 6,236,395 B1 | 5/2001 | Sezan et al. | |
| 6,246,401 B1 | 6/2001 | Setogawa et al. | |
| 6,275,829 B1 * | 8/2001 | Angiulo et al. | 1/1 |
| 6,295,646 B1 | 9/2001 | Goldschmidt Iki et al. | |
| 6,311,328 B1 * | 10/2001 | Miyazaki et al. | 725/37 |
| 6,331,852 B1 | 12/2001 | Gould et al. | |
| 6,400,378 B1 * | 6/2002 | Snook | 715/716 |
| 6,411,771 B1 | 6/2002 | Aotake | |
| 6,456,305 B1 * | 9/2002 | Qureshi et al. | 715/800 |
| 6,456,334 B1 | 9/2002 | Duhault | |
| 6,467,081 B2 * | 10/2002 | Vaidyanathan et al. | 717/123 |
| 6,483,983 B1 * | 11/2002 | Takahashi et al. | 386/46 |
| 6,492,997 B1 * | 12/2002 | Gerba et al. | 715/721 |
| 6,496,206 B1 | 12/2002 | Mernyk et al. | |
| 6,510,554 B1 * | 1/2003 | Gordon et al. | 725/90 |
| 6,522,342 B1 | 2/2003 | Gagnon et al. | |
| 6,721,488 B1 * | 4/2004 | Dimitrova et al. | 386/46 |
| 6,870,573 B2 | 3/2005 | Yeo et al. | |
| 6,938,215 B2 | 8/2005 | Kobayashi et al. | |
| 2002/0056098 A1 * | 5/2002 | White | 725/39 |
| 2002/0056119 A1 | 5/2002 | Moyniham | |
| 2002/0171682 A1 | 11/2002 | Frank et al. | |
| 2004/0054964 A1 * | 3/2004 | Bozdagi et al. | 715/500.1 |
| 2004/0107439 A1 * | 6/2004 | Hassell et al. | 725/44 |
| 2004/0128685 A1 | 7/2004 | Hassel et al. | |
| 2004/0172588 A1 | 9/2004 | Mattaway | |
| 2005/0111829 A1 * | 5/2005 | Ito et al. | 386/69 |
| 2008/0240672 A1 | 10/2008 | Ikeda | |

FOREIGN PATENT DOCUMENTS

| | | |
|---|---|---|
| JP | 09-200687 A | 7/1997 |
| JP | 10-079921 A | 3/1998 |
| JP | 11-032301 A | 2/1999 |
| JP | 11-150691 A | 6/1999 |
| JP | 11-205718 A | 7/1999 |
| JP | 11-288580 A | 10/1999 |

OTHER PUBLICATIONS

USPTO Office Action dated Mar. 2, 2010 for U.S. Appl. No. 09/644,198.

USPTO Office Action dated Oct. 5, 2009 for U.S. Appl. No. 09/644,198.

USPTO Office Action dated Sep. 14, 2010 for U.S. Appl. No. 09/644,198.

* cited by examiner

METHOD AND APPARATUS FOR ACCESSING CONTENT

CROSS-REFERENCES TO RELATED APPLICATIONS

This application is a continuation application of U.S. patent application Ser. No. 09/644,198, filed Aug. 22, 2000 and titled "Method and Apparatus for Accessing Content," which is related to and claims priority from Japanese Patent Application No. 11-372672, filed on Dec. 28, 1999, each of which are incorporated by reference herein in its entirety for all purposes.

BACKGROUND OF THE INVENTION

The present invention relates to a device for recording image information to a medium or a device for playing back image information from a medium.

Examples of systems for playing back image information recorded on media include VCRs, which have been in use for a long time, as well as video CDs, which use an optical disk with a 12 cm diameter as the recording medium. Recently, DVDs, which use an optical disk with the same diameter but with approximately seven times the recording capacity, have emerged.

In DVD playback devices, numbers are assigned to: recorded programs (in DVDs, these are called "titles" and will be referred to as such below); the plurality of scenes contained in a title (in DVDs, these are called "chapters" and will be referred to as such below); and frames, which are the basic units of the images. Cueing, where a desired image is displayed at the beginning, is accomplished by entering a title number, a chapter number, and a frame number for a desired image, determining a playback position on the disk, and playing back images beginning with this position (e.g., see Japanese laid-open patent publication number Hei 7-312737).

Also, when multiple sets of supplementary information (e.g., "multi-angle" information containing multiple images from different perspectives, separate left and right channels of audio, and different languages such as Japanese and English) are recorded simultaneously with the images, and playback conditions are selected by selecting which supplementary information to use. The selection of playback conditions is performed by switching between screens for each set of information and checking the contents of each. Supplementary information can also be recorded beforehand on the disk as a menu of playback conditions (e.g., see Japanese laid-open patent publication number 8-251531).

The conventional technologies described above are effective in cases, such as with karaoke disks, where the producer of a disk deliberately assigns numbers (e.g., numbers are assigned according to the sequence of songs) and the documentation or the like for the disk indicates the meaning associated with the numbers. However, this does not provide effective means for selecting if a user attempts to access images without the documentation. This makes accessing and searching an arbitrary position on a disk difficult. Also, it is not possible to look through the multiple sets of supplementary information all at once, thus making selection time consuming. Furthermore, if a menu for the information is recorded beforehand, the method used to display and select the information will vary according to the intentions of the program producers. This is inconvenient since each disk will involve a different method.

Also, knowing the overall content of a stream (where a stream is the information for a series of connected scenes) is difficult.

There is a need to overcome the problems of the conventional technology described above and to provide a novel information playback device that allows easy searching of information through unified operations and that allows the contents of all or at least part of a stream to be perceived and selected from a playback screen.

SUMMARY OF THE INVENTION

An information playback device comprises a driver module for accessing content on a storage medium. The content is organized into a plurality of programs, each program comprising a plurality of segments, each segment comprising a plurality of frames. A decoder module is operatively coupled to the driver module to receive an information signal from the driver module. A user input module is provided for receiving user input. A system control module controls the driver and decoder modules produce a display signal representing the programs on the storage medium. In response to receiving a user-selected program, the system control module further controls the driver and decoder modules to access a representative frame from each scene of the user-selected program and to produce a second display signal representing the representative frames. In response to receiving a user command, the system control module controls the driver and decoder modules accordingly to produce a third signal representing one or more frames from a scene corresponding to a user-selected one of the representative frames.

In an embodiment of the invention, the second display signal represents on-screen data comprising a row of tabs, each including an id symbol which represents one of the programs. The representative frames corresponding to the user-selected program are arranged in row and column fashion. In another embodiment of the invention, the representative frames are arranged in an overlapping manner. The tab corresponding to the user-selected program is visually distinct from the remaining tabs.

In an embodiment of the invention, the frames represented by the third display signal are scaled to full-screen. In another embodiment, the scaling is in accordance with a user-specified scale factor.

In another aspect of the invention, the information recording device includes an input module for recording content onto the storage device. In this aspect of the invention, the content is organized into user-defined streams. The second signal comprises a representative frame from each of the streams.

The present invention allows the user to look through the contents of programs on a storage medium in a manner that facilitates quick switching between programs. The present invention also facilitates searching and selecting by the use of simple operations.

Also, program symbols or identifiers that can identify programs and representative frames of scenes are not displayed manually, and are instead performed through unified means based on the data from the recording medium. Thus, it is possible to eliminate the inconveniences caused by different interfaces and the like based on variations in display methods between individual recording media resulting from the intentions of the program producers.

Of course, appropriate modifications and the like can be made to the playing back and displaying of representative frames in order to allow confirmation of the display contents and the like.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

The following is a detailed description of the embodiments of the present invention, with references to the figures showing a number of embodiments of the information playback device and the information recording/playback device according to the present invention. In FIG. 1 through FIG. 18, elements labeled with the same numerals indicate identical or similar elements.

<Embodiment 1>

The following is a description of an embodiment in which the present invention is implemented for a playback device in a DVD system.

In the embodiment below, the description will use a starting frame displayed at the beginning of a scene as a representative frame or as a representative small frame.

Figure 1:
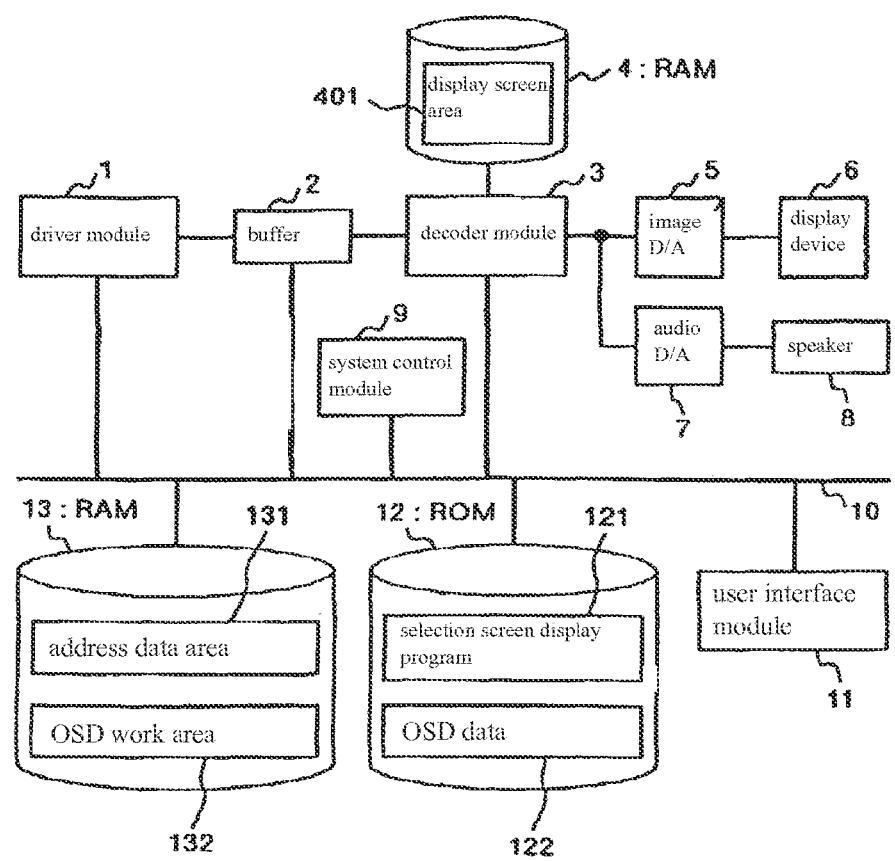
FIG. 1 is a block diagram for the purpose of describing a first embodiment of an information playback device and an information recording/playback device according to the present invention.

FIG. 1 shows: a driver module 1 playing back an information signal from a position on a disk corresponding to a specified address; a buffer module 2 temporarily storing the information signal output from the driver module 1; a decoder module 3 decoding images and audio from the information signal from the buffer module 2; a random access memory (hereinafter referred to as "RAM") 4 storing data while the decoder module 3 is operating; a digital/analog converter (hereinafter referred to as "D/A converter") 5 converting digital signals of images output from the decoder module 3 into analog signals; a display device 6 displaying an image analog signal from the D/A converter 5; a D/A converter 7 converting the audio digital signal output from the decoder module 3 to an analog signal; and a speaker 8 playing back the audio analog signal from the D/A converter 7.

Furthermore, the same figure also shows: a system control module 9 controlling the operations of the driver module 1, the buffer module 2, and the decoder module 3; a user interface module 11 using user instruction inputs to generate control signals and transferring these control signals to the system control module 9; a read-only memory (hereinafter referred to as "ROM") 12 in which are pre-stored data and programs for controlling the sequences of operations performed by the system control module 9; and a RAM 13 storing data used during operation of the system control module 9. The driver module 1, the buffer module 2, the decoder module 3, the system control module 9, the user interface module 11, the ROM 12, and the RAM 13 are connected to each other by a bus line 10.

The decoder 2 that is used here can reduce the size of an image when decoding image signals.

In addition to standard control programs and control data for the system control module 9, the ROM 12 contains a selection screen display program 121 and an OSD data 122 according to the present invention. The OSD data 122 is data for a screen superimposed on playback images (hereinafter referred to as "OSD (On Screen Display) screens"). The RAM 13 contains: an address data area 131 storing address data indicating the playback starting positions of titles of images recorded on a disk and address data indicating playback starting positions for chapters; and an OSD work area 132 storing OSD data converted into bitmap data to be displayed on screen. These will be described in detail later. Furthermore, the RAM 4 contains a display screen area 401 holding data for selection screens formed by combining the OSD bitmap data and image data.

Figure 2:
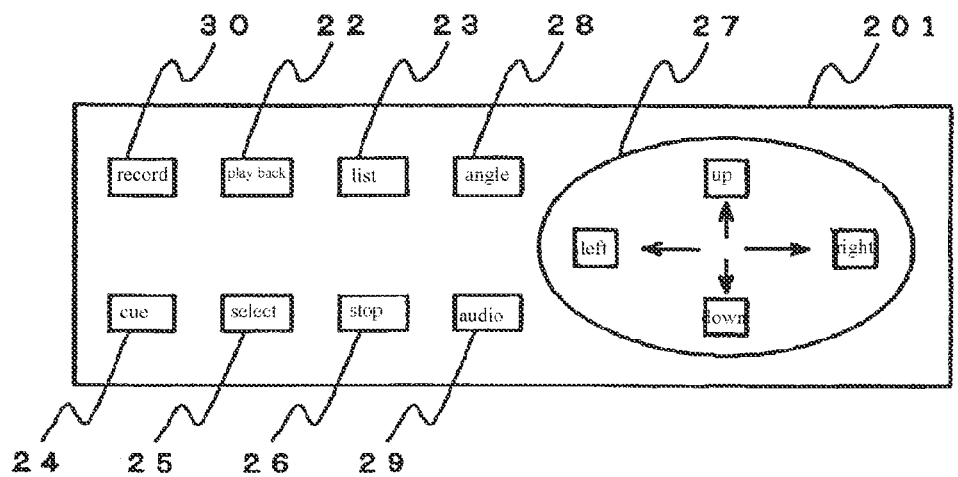
FIG. 2 shows a button arrangement figure for the purpose of describing a remote control used in the embodiment.

The user interface module 11 includes a remote control unit (hereinafter referred to as the remote control) used by a user to enter instructions and an infrared transmission path to transmit the control signals generated by the remote control to the playback device. The arrangement of the input buttons on the remote control is shown in FIG. 2.

Figure 3:
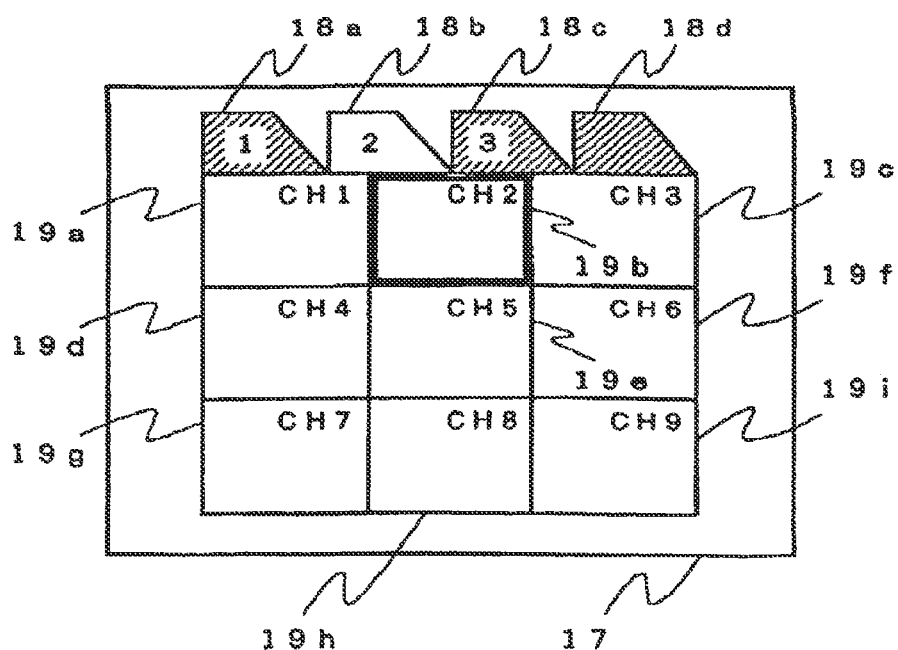
FIG. 3 is a figure showing a sample video selection screen from a first embodiment.
Figure 4:
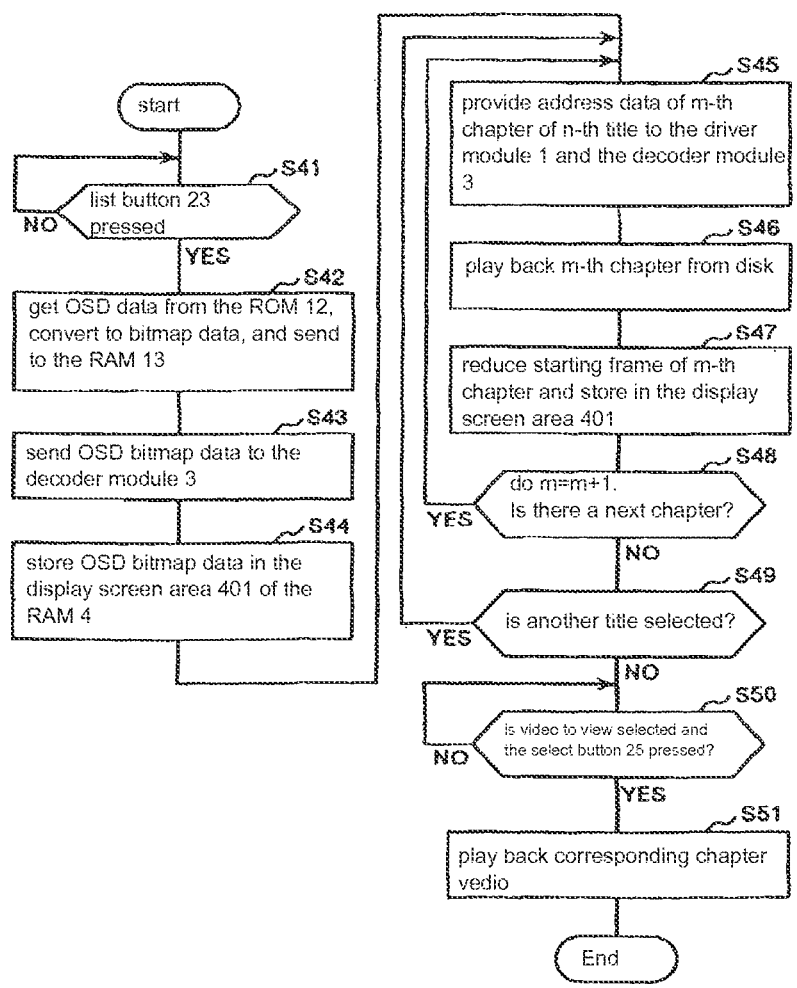
FIG. 4 is a flowchart for the purpose of describing the operations performed by a selection screen display program according to the present invention.

The input buttons on the remote control 201 include: a playback button 22 for playing back a disk; a list button 23 for selecting an image to view; a select button 25 for selecting and entering an image from the images (selection images) displayed by pressing the list button 23; a stop button 26 for stopping image playback; an angle button 28 for selecting multi-angle images; an audio button 29 for selecting audio playback conditions; and cursor buttons 27 used to select an image or a symbol from the screens displayed when the list button 23, the multi-angle button 28, or the audio button 29 is pressed. Controls signals based on user instructions are generated by the user pressing these buttons. The cursor buttons 27 are an arrangement of buttons to allow a selection to be moved up or down and left or right on the screen. Additionally provided are a cue button 24 for playing back an image by entering an address when the address of the image to be viewed is known beforehand, and a record button 30 to begin recording. FIG. 3 shows an example of a selection screen obtained by running the selection screen display program 121 (see FIG. 1) of the present invention. In a selection screen 17, the symbols for individual titles stored on the disk are displayed as numbers in frames (hereinafter referred to as tags) 18 at the upper part of the screen, and starting frames 19 of individual chapters of titles are displayed in a reduced size. The reduced frames will hereinafter be referred to as small frames. In this example, there are three titles. The second title is selected and its tag 18b is displayed brighter. The small frames 19a-19i for the nine chapters in the title are displayed, and the second small frame 19b is selected. While four tags can be displayed, there are only three titles so the fourth tag 18d is not labeled. The OSD screen includes the tags 18, the numerals displayed in the tags, the chapter numbers for small frames 19a-19i (CH1-CH9), and the borders separating the small frames. The OSD does not include the small frames. Next, the operations performed by the system control module 11 according to the selection screen display program 121 will be described, with references to the flowchart shown in FIG. 4. The operations begin with the address data indicating playback starting positions for all titles and all chapters of the images recorded on the DVD disk being stored in the address data area 131 of the RAM 13. The storing of address data can be performed after the playback device is turned on, a disk is mounted, and the playback button 22 of the remote control 201 is pressed. The address data can be obtained directly from the buffer 2 without going through the decoder 3 (see FIG. 1).

In the description below, the title numbers stored in the disk will be represented by "n" and the chapter numbers of these titles will be represented by "m".

When the user presses the list button 23 of the remote control 201 (S41), the OSD screen data for the number of tags displayed on a screen (four in the case of the example shown in FIG. 3) is retrieved from the OSD data 122 of the ROM 12. This is converted into bitmap data to be displayed on the screen and is transferred to the OSD work area 132 of the RAM 13 (S42). This stored OSD screen data is then sent to the decoder 3 (S43). The decoder 3 stores the received data in the display screen area 401 (S44). At this point, the decoder 3 is informed of the number of titles recorded on the disk and a reference value for brightness levels used in displaying the small-frame images for the selection screen. When playback is begun and the increasing brightness level reaches the reference value, the corresponding small-frame image is used in the selection screen as the starting frame for the chapter. The decoder 3 uses the given number of titles to sequentially insert title numbers, and this data is stored in the display screen area 401. The use of numbers as the symbols representing title numbers is just one method. Of course, depending on the purpose, it would also be possible to use other types of symbols or simple identifiers or names that allow programs to be identified.

Next, the address data for the first chapter (m=1) of the first title (n=1) is retrieved from the address data area 131 and is sent to the driver module 1 and the decoder module 3 (S45). The driver module 1 begins playing back the information starting at the playback starting position of the disk corresponding to the address data (S46). The decoder 3 reduces the image of the playback signal and stores the small-frame image data in the display frame area 401. The small-frame image data is stored in a predetermined position in the display screen area 401 so that the small-frame image is placed at a position (19a in FIG. 3) in the selection screen corresponding to the chapter number (m=1). The decoder 3 also stores the data for the increased brightness in the tag of title 1 in the display screen area 401.

Then, similar operations are performed to place a small-frame image of the next chapter (m=2) at the corresponding chapter number position (the reduced frame 19b from the same figure), and this data is stored in the display screen area 401. The small frame of each chapter is placed in its appropriate position in this manner, completing the selection screen for the first title in the display screen area 401 (S47).

Next, if the user presses the cursor buttons 27 to select a tag having the number n, i.e., to select the $n^{th}$ title (S48), the small frames of the chapters of the title are placed in their respective positions, and operation S45—operation S47 are performed to complete the selection screen for the selected title.

If the user selects a frame using the cursor buttons 27 (S49), the border lines around the selected frame are displayed thicker to indicate that the frame is selected.

As described above, FIG. 3 shows a selection screen where n=2 is selected and m=2 is selected. If the image that the user wants to view is this chapter, the user presses the select button 25 on the remote control 201. This causes a command for exiting the selection operation to be sent to the decoder module 3, and the address data for the chapter is sent to the driver module 1 (S50).

When this command is received, the decoder module 3 deletes the OSD screen data and stops frame reduction operations. The driver module 1 plays back information from the corresponding chapter. This causes the images from the chapter to be displayed full-screen (S51), and the operation is finished.

This embodiment is implemented for DVD disks, but the present invention is not restricted to this. The present invention can also provide similar advantages when implemented for other recording media in which title data is recorded beforehand, e.g., other types of disks and tape media as well as semiconductor-based recording media such as memory.

The selection screen described above is the same regardless of what recording media is used to record title data. Thus, the present invention allows the user to select programs to be viewed using a common set of operations.

Also, the user can look through multiple chapters of a title, and titles can be selected quickly using buttons. Thus, the contents of all or at least part of the programs stored on the disk can be easily known.

In the present invention, means for selecting frames using multiple reduced frames and button operations can also be applied to the selection of playback conditions, e.g., selection of multi-angle frames, the selection of audio playback and languages, and the like. Multi-angle frames are provided in chapters by the program producer. In such cases, the availability of the multi-angle feature is displayed in the chapter frame and address data for multi-angle frames are output from the disk.

Figure 5:
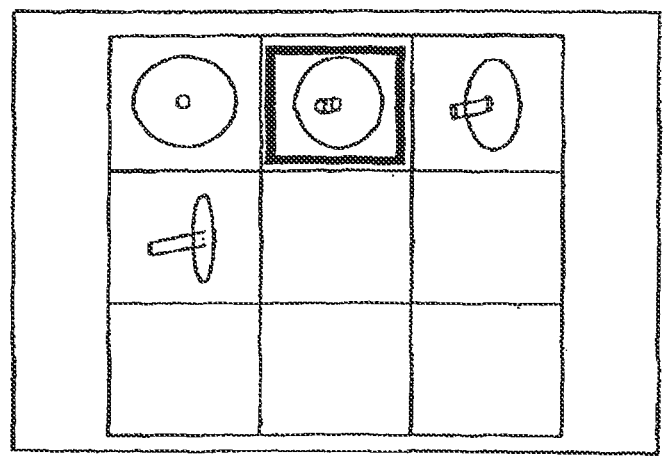
FIG. 5 is a figure showing an example of a multi-angle selection screen.

If the user sees the multi-angle option displayed and presses the multi-angle button 28 on the remote control 201 (see FIG. 2), the selection screen display program 121 replaces the chapter with multi-angle images and performs operation S41 through operation S51 to arrange and display multiple reduced multi-angle frames. FIG. 5 shows an example of these type of frames (selection frames).

The user operates the cursor buttons 27 to select (surround with thick lines) an angle frame to view and presses the select button 25. That frame is then played back full-screen.

Regarding the selection of playback conditions, the data for the various playback conditions are also output when playback of the disk is begun, so multiple conditions can be displayed on the screen and selected using the method described above.

Figure 6:
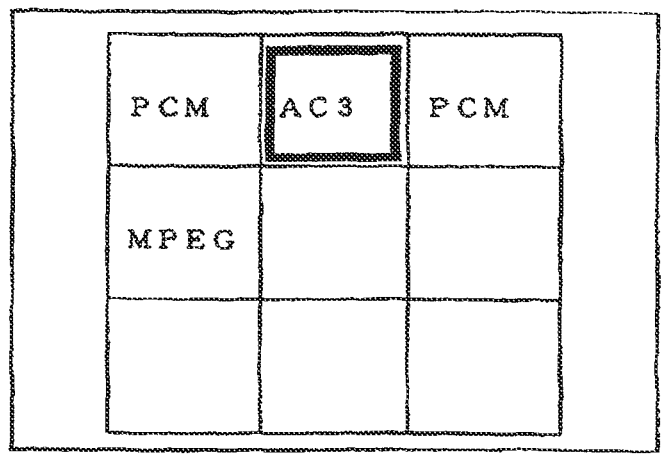
FIG. 6 is a figure showing an example of an audio information selection screen.

FIG. 6 shows an example of a selection screen where selection of playback conditions involves making a selection from multiple types of audio. The different types of audio are displayed according to the types of audio information. A single screen can display a list of audio information types available on the disk, and a desired audio information type can be quickly selected. In FIG. 6, the audio information types are listed as MPEG, Dolby AC3, and two systems of linear PCM, which are international standards of DVD disk audio formats. Of these, the Dolby AC3 type is selected.

Next, when the select button 25 is pressed, Dolby AC3 audio is played back.

In addition, the means of the present invention described above can be used to display small-frame images for playback condition options instead of displaying these playback condition options (e.g., audio format, language, playback mode), thus allowing the different playback conditions to be listed and selected using the same simple operations that were described above.

<Embodiment 2>

Figure 7:
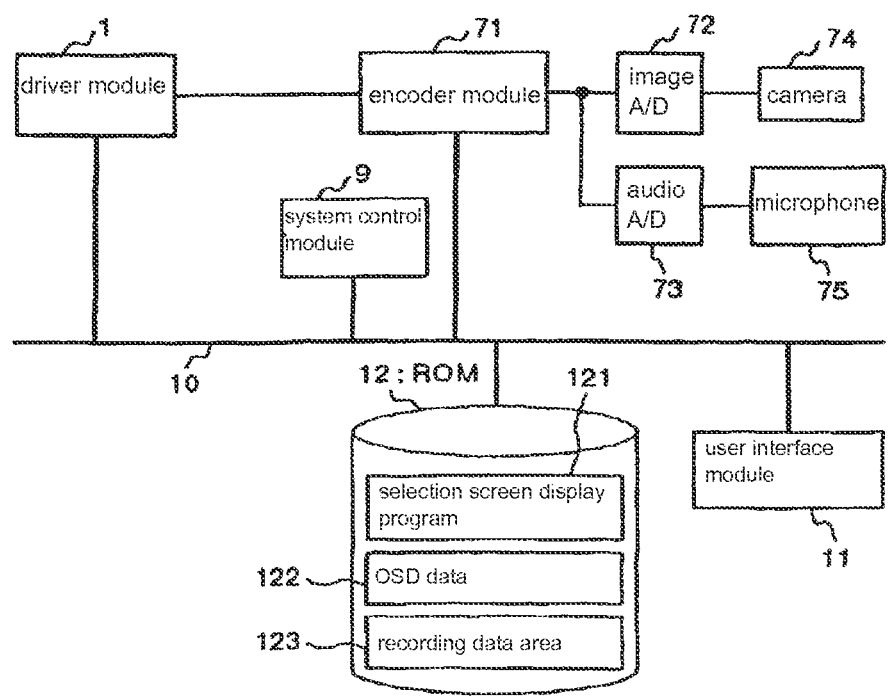
FIG. 7 is a block diagram for the purpose of describing a second embodiment of the present invention.

FIG. 7 shows an embodiment in which information recording capabilities are added to a playback device. Recorded information can be played back using selection operations similar to those from embodiment 1. The architecture used for playback is omitted in the figure to simplify the drawing.

In this embodiment, a program is added to the selection screen display program 121 to have the system control module 9 save recording data. Furthermore, a write-able memory is used for the ROM 12, and a recording data area 123, for storing recording data, is included in the ROM 12.

When a camera is used to record images, an image signal from a camera 74 is converted to a digital image signal by an image A/D converter 72. Also, an audio signal from a microphone 75 is converted to a digital audio signal by an audio A/D converter 73. The two digital signals are encoded by an encoder 71 and then recorded to a disk by the driver module 1. The recording operation is started by pressing the record button 30 on the remote control 201. The position on the disk at which recording is to be started is indicated by position information address data retrieved from the disk. The system control module 9 stores the address data in the recording data area 123.

If the images are to be formed as titles and chapters contained in titles, the address data for title starting positions are also stored.

The contents of the recording data area 123 are similar to the contents of the address data area 131 when playback is started. When performing playback, the data from the recording data area 123 is used and the operations in operation S41 through S51 from embodiment 1 are performed, thus allowing the selection of images to be viewed in a similar manner as embodiment 1.

The data stored in the recording data area 123 can be recorded all at once to free space on the disk. If the disk is to be played back on a different information recording/playback device or information playback device, the same selection screens as described above can be generated by providing the selection screen displaying program 121 modified to retrieve recorded data from the disk.

<Embodiment 3>

As an example of how a system combining an information recording/playback device and a camera can be used, a regular user could record various types of events such as weddings, vacations, and school field days. If a stream consists of a continuous scene created by pressing the record button 30 of the remote control 201 (see FIG. 2) to begin recording and by pressing the stop button 26 to stop recording, the recordings will be a set of a plurality of streams.

If this set of recordings is referred to as a video program, the recording units of a video program could be the event, the date, the time, the location, or the like. The units to be used will be based on what the user wants. If the unit used is the date and time, then time data can be obtained from a clock generally provided inside the information recording/playback device, and this data would be converted to symbols representing the video program. If the unit used is the event, location, or the like, character buttons can be provided on the remote control 201, and the user would use these buttons to enter the name (or shortened names) of the event, location, or the like. This would be converted to symbols representing the video program.

In this embodiment, a video program formed from a plurality of streams is recorded as described above. To playback the recorded program, small-frame images representative of the plurality of streams are displayed for each video program, and a desired representative small-frame image is selected from the resulting selection screen. Then, this stream is enlarged full-screen and played back.

To implement this embodiment, the encoder module 71 shown in FIG. 7 and a decoder module not shown in FIG. 7 are both made capable at least of image compression/encoding that generates I-pictures. Furthermore, a program is added to the selection screen display program 121 shown in FIG. 7 that makes the system control module 9 perform the operations described below.

For recording operations, data for the symbol entered by the user for a video program as described above are stored in the recording data area 123 (see FIG. 7) of the ROM 12. At the same time, the address data for the starting position on the disk of the video program is also stored. Furthermore, the address data for the starting positions on the disk of the streams are also stored in the recording data area 123. This address data is the address data obtained from the disk when the record button 30 is pressed to record the stream.

For playback operations, an OSD screen is displayed when the list button 23 is pressed. The video program symbols stored in the recording data area 123 are displayed in the in the selection screen tags of the OSD screen. Using the symbol data, the address data, and the stream address data for the video program stored in the recording data area 123, the streams of each video program are played in sequence. The first I-picture of a stream is used as the representative small frame displayed on the selection screen. When an I-picture is displayed, playback of the next stream is started immediately.

In image compression/encoding systems such as MPEG1 and MPEG2, which are set forth as international standards, video is created from three types of field frames: I-pictures, P-pictures, and B-pictures. Of these, compression and encoding in I-pictures are performed solely within the frame and can exist independently as static images. I-pictures can be obtained from the decoder module 3.

Figure 8:
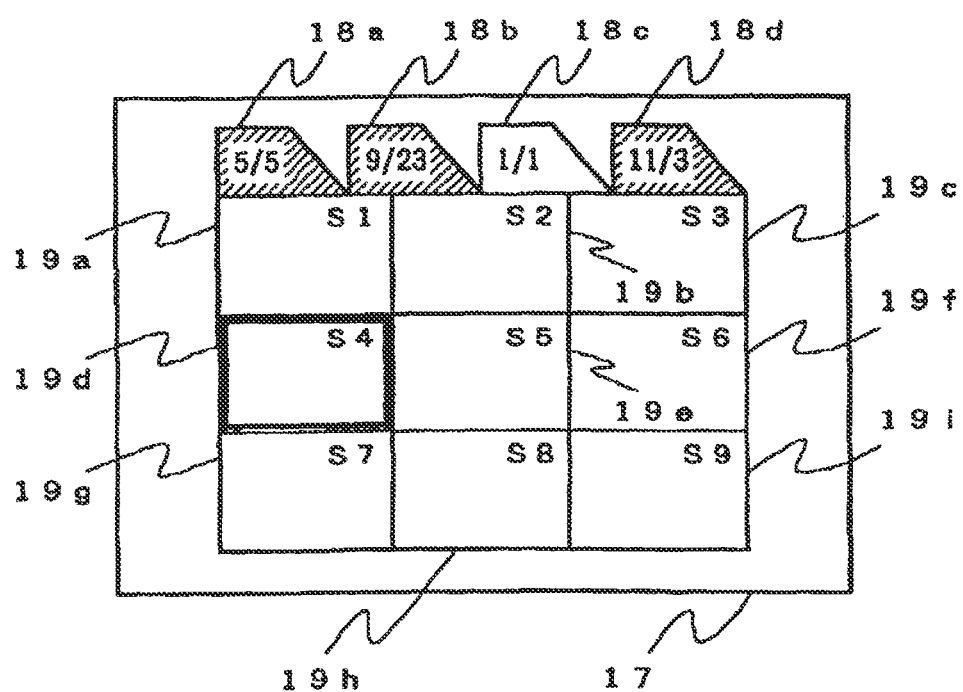
FIG. 8 is a drawing for the purpose of showing an example of a video selection screen according to a third embodiment of the present invention.

FIG. 8 shows an example of a selection screen provided by this embodiment. Dates are displayed in the tags, and the first I-pictures from the plurality of streams in the January 1 video program are reduced and displayed as representative small frames (S1-S9). A fourth representative small frame S4 is displayed. The select button 25 is pressed to set up the frame to be viewed, and that stream is subsequently played back full-screen from the beginning as in embodiment 1.

The various types of data stored in the recording data area 123 can be recorded in free space in the disk. If the disk is to be played back on a different information recording/playback device or information playback device, the same selection screens as described above can be generated by providing a selection screen displaying program 121 that has been modified to retrieve different types of data from the disk.

Also, the buttons on the remote control 201 can be provided on a side surface or a rear surface of the camera. This makes the camera easy to use.

<Embodiment 4>

The following is a description of an embodiment in which a user-selected frame is used as the representative small frame for a stream rather than an I-picture as in embodiment 3. After recording a plurality of streams forming a video program to a disk, these streams are played back. When a frame that the user wants to use as a representative frame is displayed, the select button 25 of the remote control 201 is pressed. The time between when playback of the stream starts and when the select button 25 is pressed can be measured using a timer that is generally provided in the information recording/playback device. This time serves as data used to extract the representative small frame.

In this embodiment, the selection screen display program 121 is modified from the program in embodiment 3 so that the following operations are performed by the system control module 9.

When recording, the time data described above for the frame to be used as the representative small frame is stored in the recording data area 123 or a predetermined free area in the disk. During playback, the representative small frames are retrieved using the data stored in the recording data area 123 or the free space on the disk and displayed in the selection screen.

The representative small frames do not have to all be user-selected. Certain streams can use I-pictures, and the user can indicate which method to use. If all the representative small frames are to be selected by the user, it would of course be possible to use a compression/encoding system that does not generate I-pictures.

<Embodiment 5>

The following is a description of an embodiment where, for each stream, the user provides an independently created static image or character image to serve as the representative small frame for the stream, and this is recorded onto the disk.

In addition to using a static image mode on a camera, a static image can be produced using a dedicated static image camera (e.g., an electronic still camera), a scanner, or the like. Character images can be produced through keyboard entry.

In this embodiment, an area that is large enough to hold static images or character images is set up in the recording data area 123 or the free space of the disk. In addition, a table is set up to associate the static images or character images with their corresponding streams.

The selection screen image display program 121 of this embodiment is modified from the program in embodiment 3 so that the system control module 9 performs the following operations.

After shooting a video program made up of a plurality of streams, static images or character images are created for the streams, and these are stored in the free area described above. When doing this, the area is placed in a data standby state so that data can be recorded into the table described above. Next, as described in reference to embodiment 2, the disk is played back and a selection screen for the corresponding video program is displayed. A selection is made from the small frames for the streams, and the select button 25 is pressed. If the select button 25 is pressed while the data standby state is in effect, the stream is not played back and instead the starting position address data for the stream resulting from the frame selection is sent to the area where the standby state is in effect. The address data is recorded into the table as data associating the stream with a stored static image or character image. Then the area is released from the standby state.

In this manner, the table is completed by associating each stream with a static image or a character image.

During playback, the address data for streams are retrieved. The table is used to extract the static image or character image associated with the data, and this is then displayed as a representative small frame.

Of course with this embodiment as well, the compression/encoding system can be a method that does not generate I-pictures.

<Embodiment 6>

The following is a description where a plurality of streams is grouped together and a single representative small frame is obtained from the set of streams. In this case, the set of streams forms a sub-program, and a single video program is formed from a plurality of sub-programs. In other words, there is a hierarchical structure of stream, sub-program, and video program.

In this embodiment, symbols are applied to a sub-program each time a sub-program is formed, and the streams in the sub-program are played back to allow the user to select one representative small frame.

The selection screen display program 121 of this embodiment is modified from the program in embodiment 3 so that the system control module 9 performs the following operations.

The disk is played back as described with reference to embodiment 2, and a corresponding selection screen for the video program is displayed. Next, symbols to be assigned to the sub-programs that will be formed are set up. The user selects the symbols to be numbers, time or date, events, locations, or the like. The symbol data are determined by having the user enter symbols using the buttons. Next, the user selects streams from the selection screen to be included in a sub-program and presses the select button 25. When the selection of the streams is completed, the select button 25 is pressed twice. This indicates that the sub-program is completed.

Before the sub-program is completed, the data for the video program symbols, the starting position address data, the symbolic data for the sub-program, and the starting position address data for each of the plurality of streams in the sub-program are associated with each other and stored in the recording data area 123 or free space in the disk. Next, the plurality of streams corresponding to the completed sub-program is played back, and the user selects a single representative small frame. As with embodiment 4, this representative small frame data is indicated by the time elapsed from the start time of the stream, and this time data is stored in association with the items of data described above.

Figure 9:
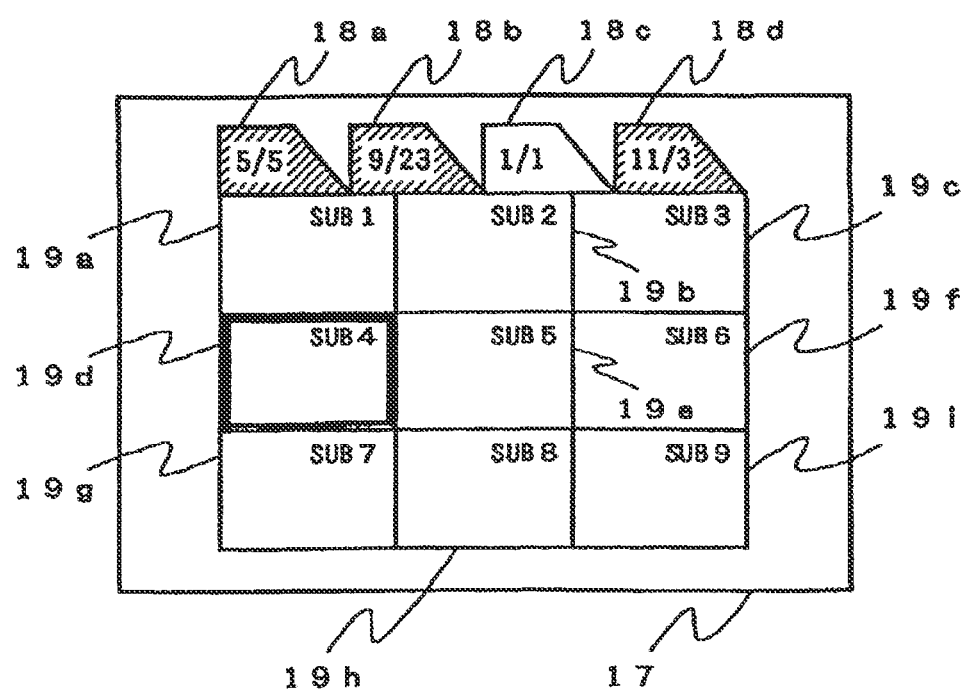
FIG. 9 is a drawing for the purpose of showing an example of a video selection screen according to a sixth embodiment of the present invention.

By using the relational data stored in this manner, selected frames for sub-programs can be displayed. The selected frames are similar to those from FIG. 8, and an example is shown in FIG. 9. The code SUB on the representative small frames indicate that they are for sub-programs, and the user-selected small frames are displayed there. Instead of SUB, the displayed code can be a symbol provided for the sub-program.

When the user selects a desired representative small frame, the story contained in the sub-program is played back in sequence.

In addition, the relational data described above can be used to display sub-program symbols in tags. For each sub-program, selected frames can be displayed for the plurality of streams in the sub-program.

This embodiment is useful when a video program is created from a very large number of streams.

Of course in this embodiment as well, the compression/encoding system can be a system that does not generate I-pictures.

Conversely, a system that generates I-pictures can be used as the compression/encoding system, and instead of having the user select the representative small frames, the first I-picture from a selected stream can be used as the representative small frame.

Also, an image displaying representative small frames can itself be a single image file.

Furthermore, it would also be possible to place the representative small frame for a stream inside the stream or near the stream, forming a one-to-one correspondence between the stream and its representative small frame. Then, the representative small frames for the streams can be collected to create the selection screen. In this case, if streams are deleted or added, the selection screen is newly created by collecting the representative small frames for the streams. Thus, the adding and deleting of streams can be performed more easily than creating the selection screen as a single image file.

<Embodiment 7>

Figure 10:
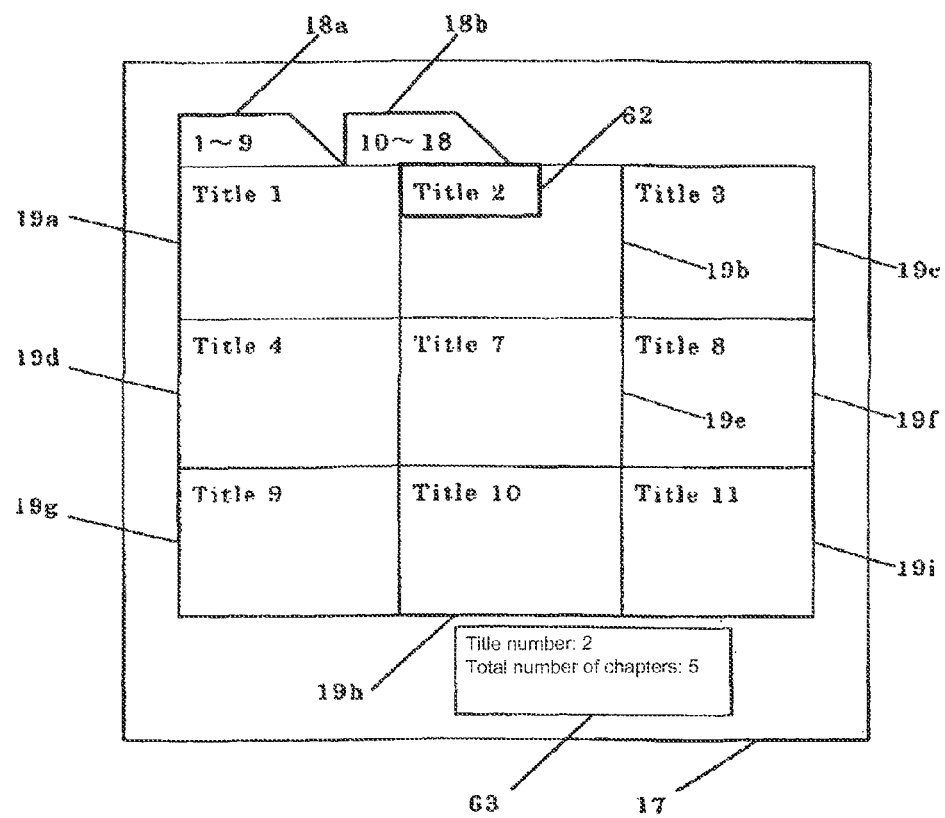
FIG. 10 is a drawing showing an example of a video selection screen for a seventh embodiment of the present invention.
Figure 11:
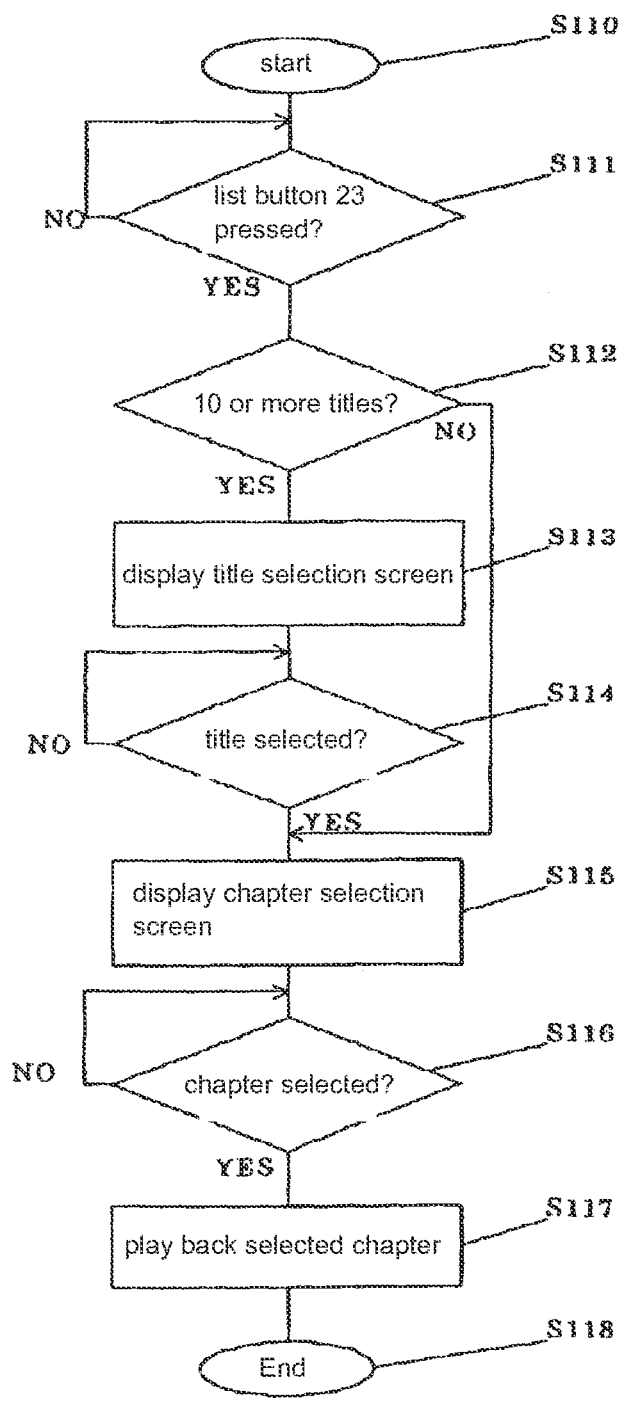
FIG. 11 is a flowchart for the purpose of describing an algorithm used in a seventh embodiment of the present invention.

FIG. 10 shows another embodiment of a selection screen obtained by running the selection screen display program 121 (see FIG. 1) of the present invention.

In the selection screen 17, numbers are displayed in the frames (hereinafter referred to as "tags") 18 at the upper part of the screen based on the number of titles stored on the disk, and representative frames 19 from the titles are displayed. In this example, the disk contains 18 titles, and representative frames 19a-19i are displayed from the nine titles, from title number 1 through title number 9.

The display brightness of the title number 2 is increased (a highlighted display section 62) in order to indicate that the second title number 2 (19b) is selected.

The title number of the selected title and the total number of chapters in the title are displayed in a detailed display section 63.

In this example, four tags can be displayed in one screen. In a display for 18 titles, the first tag can be assigned, for example, title number 1 through title number 9, and the second tag can be assigned title number 10 through title number 18. In this example, the third and fourth tags are not displayed. Of course, the display method can be changed as appropriate, e.g., display the tag frame but do not add the title numbers.

The OSD screen includes the tags 18, the numerals displayed in the tags, the title numbers for small frames 19a-19i (Title 1-Title 9), and the borders separating the small frames. The OSD screen does not include the small frames. The following is a description of the operations performed by the system control module 11 according to the selection frame display program 121 of the present invention, with references to the flowchart shown in FIG. 11.

The operations begin, for example, after the address data indicating title and chapter playback starting positions of the images recorded on the DVD disk have been stored in the address data area 131 of the RAM 13. The storing of the address data can be performed, for example, after the playback device is turned on, a disk is mounted, and the play button 22 of the remote control 201 is pressed.

At the start of the operations (S110), the system waits for the list button 23 of the remote control 201 to be pressed by the user (S111).

Up to nine representative frames can be displayed on the display screen. Thus, if the number of titles stored on the disk is 10 or more (S112), a selection screen for selecting a title is displayed (S113).

It would also be possible to eliminate the branching for this step (S113) and always display the title selection screen.

The title selection screen displays tags (in the case of FIG. 10 the number of tags is two) that indicate the range of title numbers displayed on the display screen.

Playback is started and the representative frame images are used in the selection screen as the starting frames for the titles.

When a title is selected from the title selection screen (S114), a chapter selection screen is displayed for chapter selection (S1115).

Playback is started and the representative frame images are used as the chapter images for the selection screen. When a chapter is selected from the chapter selection screen (S116), the selected chapter is played back (S17), and the operation is completed (S118).

If there is only one chapter in the title selected from the title selection screen, it would also be possible to have the playback of the title begun immediately without going through the chapter selection screen.

If the list button 23 of the remote control 201 is pressed again without selecting a title or a chapter, the selection screen is removed and the state from when the list button 23 of the remote control 201 was pressed (right before the selection screen was displayed) is restored.

Figure 12:
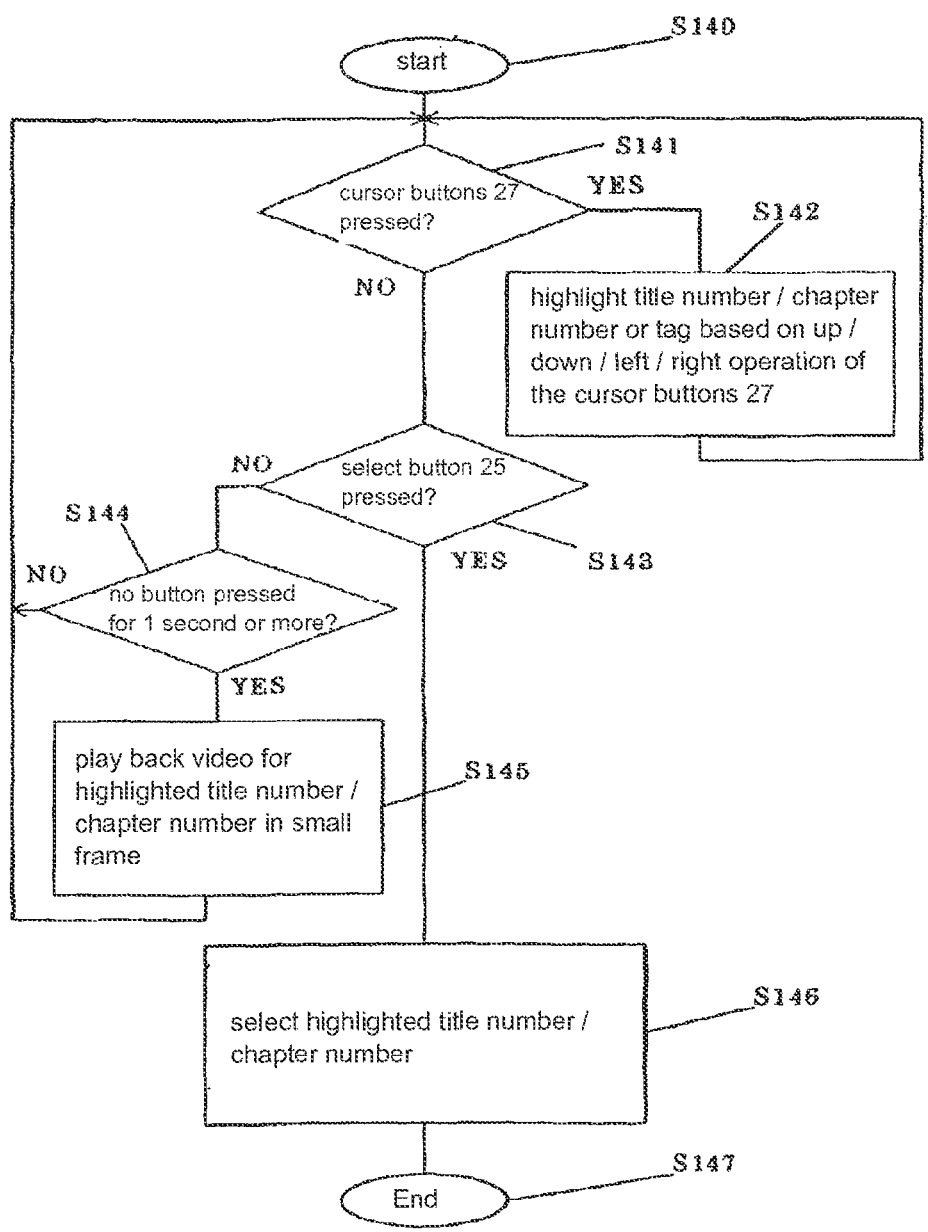
FIG. 12 is a flowchart for the purpose of describing the operations performed in a title selection screen and a chapter selection screen used in a seventh embodiment of the present invention.

FIG. 12 shows a flowchart describing the operations performed in the title selection screen and the chapter selection screen.

At the start of the operation (S140), the system waits for the user to press either the cursor buttons 27 (S141) or the select button 25 (S143) on the remote control 201. If a cursor button 27 is pressed, the brightness of the representative frame title number in the title selection screen or the representative frame chapter number in the chapter selection screen or the tag corresponding to the cursor key (up, down, left, right) is increased (highlighted display section), indicating that the item is selected (S142).

If the button to move the cursor right is pressed when a title number or chapter number in the third column is selected, the next title selection screen or chapter selection screen is displayed if there is one, and the highlighted display section is set to the first column.

If the button to move the cursor left is pressed when a title number or chapter number in the first column is selected, the previous title selection screen or chapter selection screen is displayed if there is one, and the highlighted display section is set to the third column.

If the button to move the cursor up is pressed when a title number or chapter number in the first row is selected, the highlighted display section is set to a tag.

If the button to move the cursor down is pressed when a title number or chapter number in the third row is selected, the highlighted display section is not moved.

If the button to move the cursor right is pressed when the highlighted display section is at a tag, the tag to the right is highlighted and the display screen corresponding to the tag is displayed if there is a valid tag to the right. For example, if the cursor is moved from "titles 1-9" to "titles 10-18", the frames for the titles 10-18 are displayed.

If the button to move the cursor left is pressed when the highlighted display section is at a tag, the tag to the left is highlighted and the display screen corresponding to the tag is displayed if there is a valid tag to the left.

If the button to move the cursor up is pressed when the highlighted display section is at a tag, the highlighted display section does not move.

If the button to move the cursor down is pressed when the highlighted display section is at a tag, the highlighted display section is moved to a title number or a chapter number in the first row.

If there is no button input for at least a second (S114), the video for the title number or the chapter number is played back as a small frame (S145).

Playback can be performed as normal playback, frame-by-frame advancing playback, slow playback, skipping playback, fast-forward playback, and the like. The playback need not be restricted to the small-frame images for the highlighted title number or chapter number, and can be performed for any of the small frames displayed in the selection screen 17.

This playback of a small frame can be performed with or without audio.

In this embodiment, fast-forward playback with no audio is used.

After playing a title or chapter to the end, the system can be set up so that the title or the chapter is played back again from the starting position of the title or chapter (repeat playback).

The time limit for button input can, of course, be any interval including 0 seconds.

If the select button is pressed, the highlighted title number or chapter number is set up as the selected title number or chapter number (S146), and the operation is done (S147).

If a tag is highlighted when the select button is pressed, a title number or chapter number is not selected. In this embodiment, the upper left small frame in the selection screen will be selected in such cases.

In FIG. 10 for the embodiment described above, the representative frames 19a-19i are small compared to the selection screen 17. However, the representative frame 19a can be, for example, the same size as the selection screen 17. In this case, the other representative frames 19b-19i would be displayed on top of the representative frame 19a. The tags 18 shown in FIG. 10 may be eliminated. The tags 18 are not required and other display methods can be used as long as they allow titles to be identified and selected.

Figure 13:
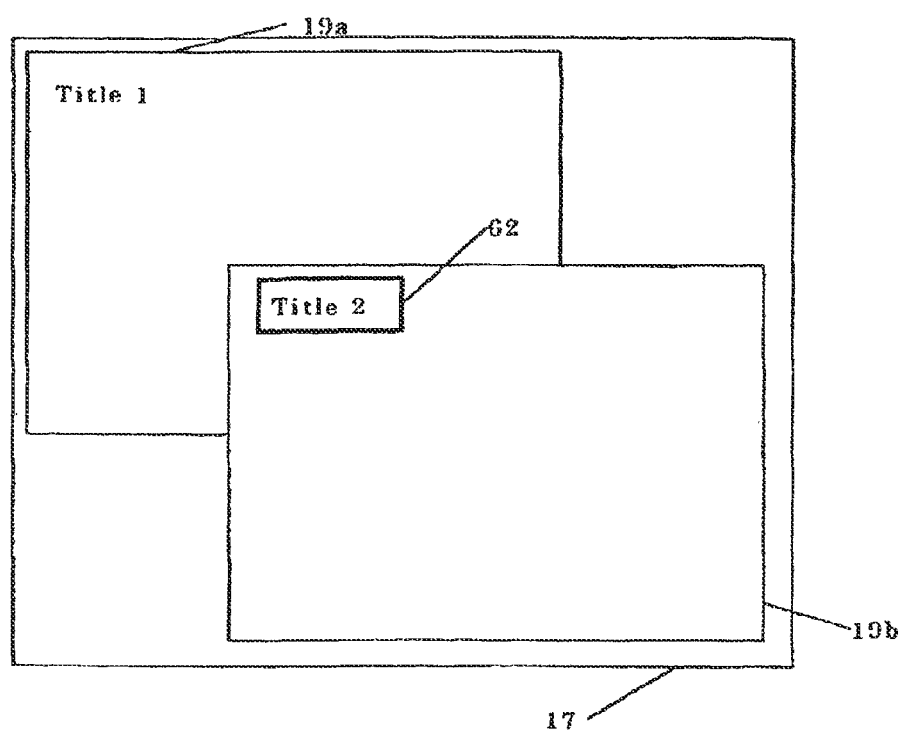
FIG. 13 is a figure showing an example of a video selection screen used in a seventh embodiment of the present invention.

In the description of the above embodiment, the starting frames are displayed in the selection screen as small frames, but the present invention is not restricted to this. It would also be possible to display multiple starting frames at any reduction rate and to have these displayed in an overlapping manner. When a frame is selected, it would be played back and displayed full-screen. An example of this is shown in FIG. 13.

Figure 14:
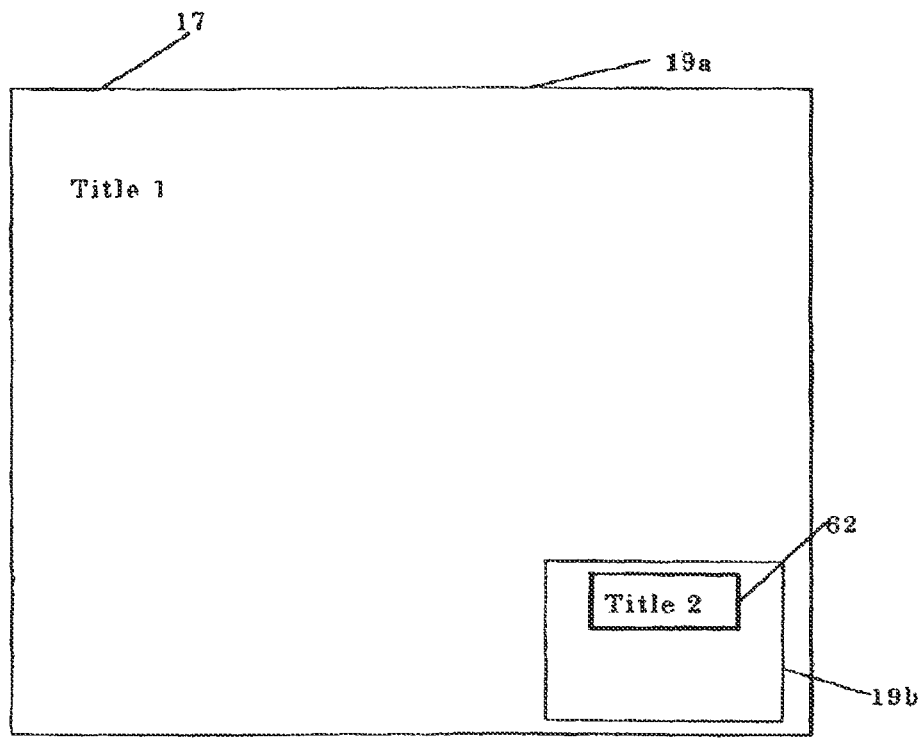
FIG. 14 is a drawing showing an example of a video selection screen used in a seventh embodiment of the present invention.

Of course, it would also be possible to have one of the starting frames displayed full-screen while the other starting frames are displayed overlapping over it. An example of this is shown in FIG. 14.

It would also be possible to use a section cut out from a full-screen image and used as a representative frame or a starting frame. An example of this will be described below, with references to FIG. 15 through FIG. 18.

Figure 15:
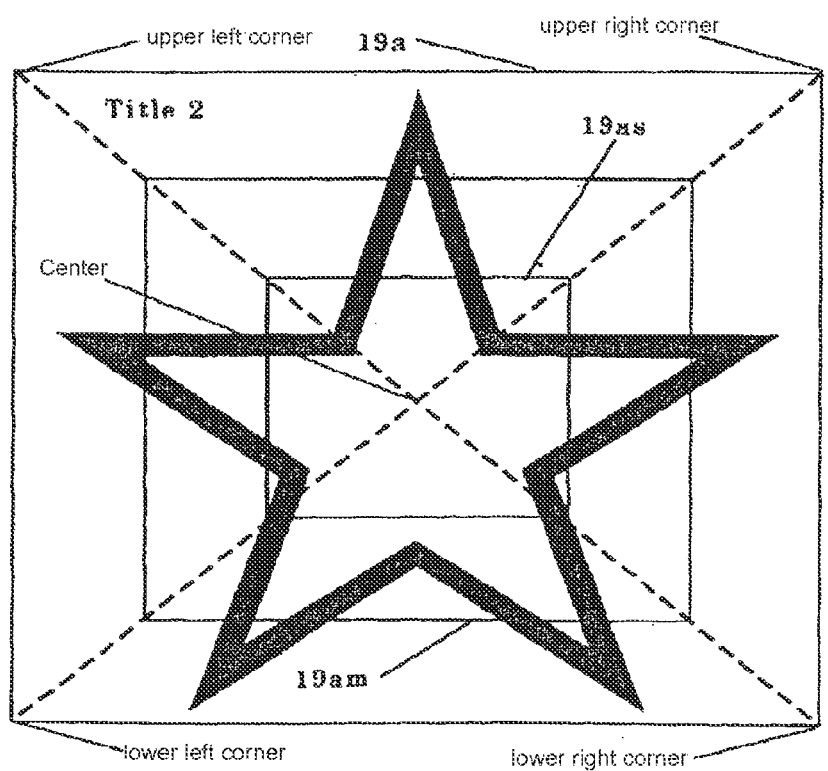
FIG. 15 is a drawing for the purpose of describing an example of a representative frame or a starting frame used in an embodiment of the present invention.

FIG. 15 shows a representative frame 19as and a representative frame 19am cut out from a full-screen image using the center of the image as a reference.

Figure 16:
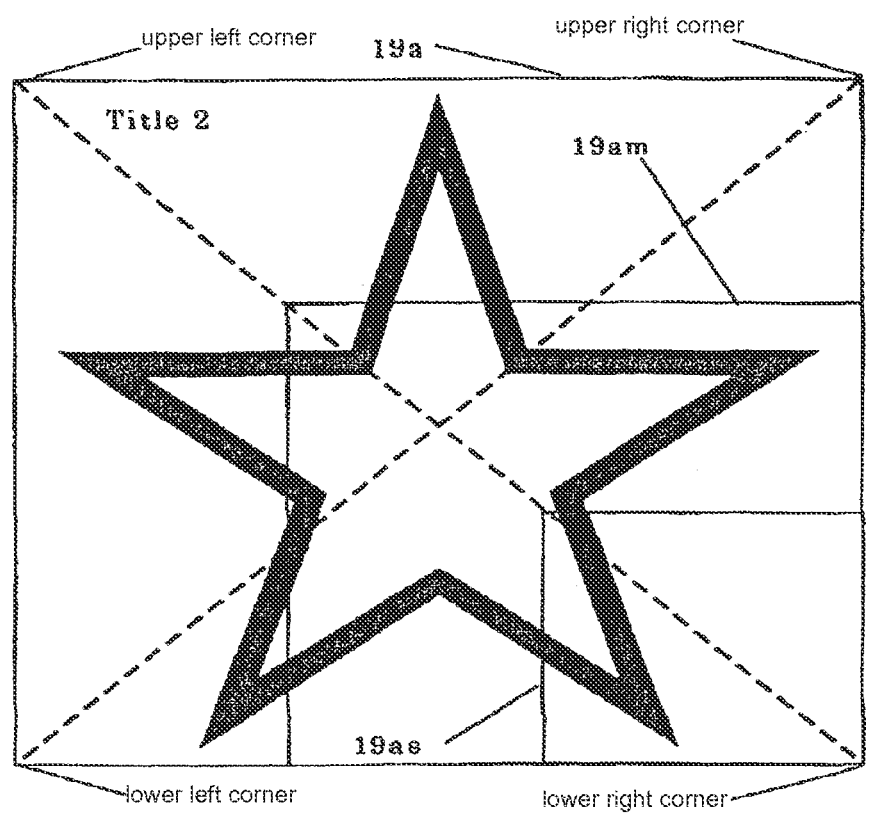
FIG. 16 is a drawing for the purpose of describing an example of a representative frame or a starting frame used in an embodiment of the present invention.

FIG. 16 shows a representative frame 19as and a representative frame 19am cut out from a full-screen image using the lower right corner as a reference. The reference position does not have to be the lower right corner and can instead be the lower left corner, the upper right corner, or the upper left corner.

Figure 17:
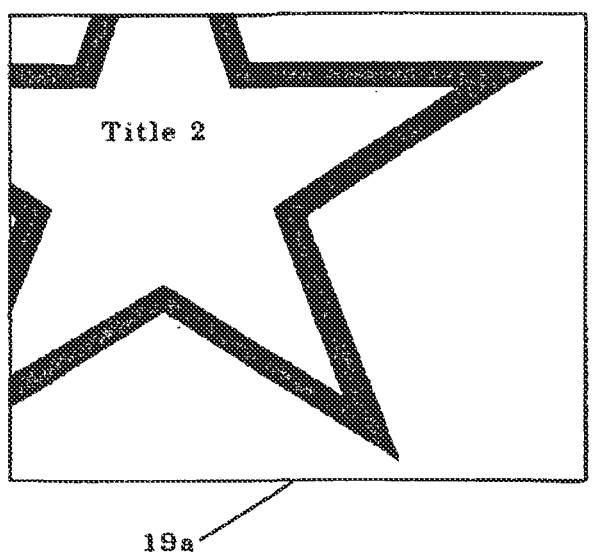
FIG. 17 is a drawing for the purpose of describing an example of a representative frame or a starting frame used in an embodiment of the present invention.

In FIG. 17, the representative frame 19am from FIG. 16 is used as the representative frame 19a displayed in the selection screen 17. The original size is retained.

Figure 18:
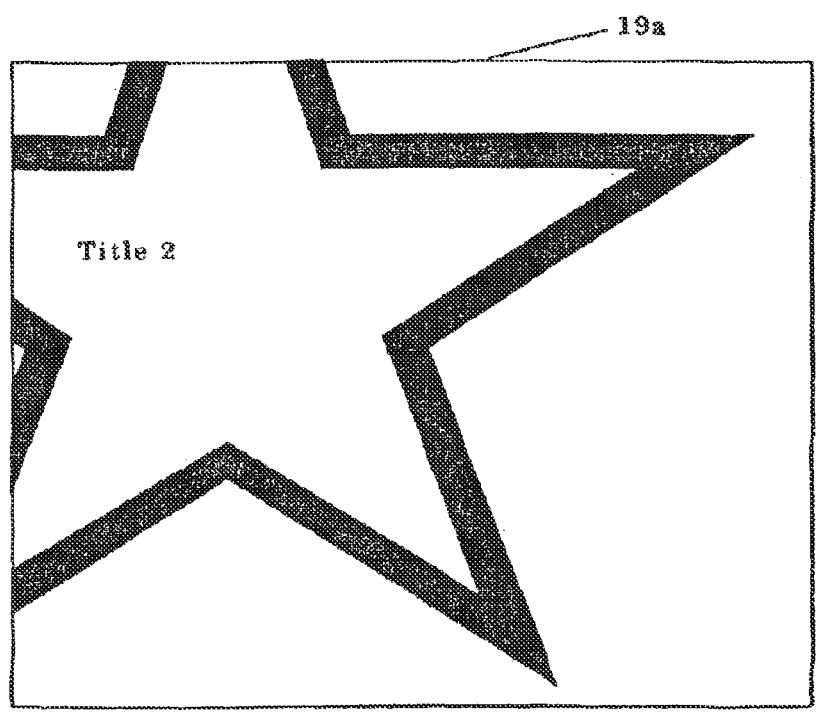
FIG. 18 is a drawing for the purpose of describing an example of a representative frame or a starting frame used in an embodiment of the present invention.

In FIG. 18, the representative frame 19am from FIG. 16 is used as the representative frame 19a displayed in the selection screen 17. The size of the cut-out is enlarged.

In the descriptions for FIG. 17 an FIG. 18, the representative frame 19am from FIG. 16 was used, but it would also be possible to use the representative frame 19as from FIG. 16, the representative frame 19am from FIG. 15, or the representative frame 19as from FIG. 15.

In the above description, the center, the lower right corner, the lower left corner, the upper right corner, or the upper left corner of the frame is used as a reference for cutting out a section. However, these positions were used as references in the description just to simplify the description.

Thus, the position to be used as a reference is not restricted to these positions, and any position on the frame can be used. The reference position can be set appropriately to allow the displayed content of the frame to be confirmed. The cut-out frame can be cut out from any position and at any size that allows the contents displayed in the frame to be confirmed. Also, the frame can be played back and displayed at any size.

Also, in the means used to display symbols corresponding to multiple programs recorded on a recording medium, the symbols corresponding to programs need not be symbols. Instead, programs can be identified using identifiers or display methods that identify programs or through frames associated with programs.

Furthermore, in the means used to display symbols corresponding to multiple programs recorded on a recording medium, symbols need not necessarily be displayed on the screen. For example, if the multiple programs recorded on a recording medium need not be selected using symbols, there is no need to display symbols corresponding to the programs on the screen. Thus, it would be possible to omit the means for displaying symbols on the screen corresponding to multiple programs.

In the description above, DVD disks are used, but the present invention is not restricted to this. The present invention can provide similar advantages when implemented for other disk recording media, tape recording media, and semiconductor media such as memory.

Also, in the description above, OSD screens are used, but the present invention is not restricted to this. Of course, it would be possible to use any type of display method that provides the advantages of the present invention's selection screen, the presentation of the representative frames, and the selection operations for representative frames.

According to the present invention, symbols provided for individual programs, or identifiers and selected symbols identifying programs, or representative frames from a plurality of scenes from a program of an identifier that can identify a program are displayed on a screen. This allows the recorded contents to be listed easily, and a user can view a video through easy selection operations.

With regard to the means for reducing the starting frames from multiple scenes in a program with a selected symbol and displaying these on the screen, if any reduction ratio including no reduction can be used, then it would be possible to allow a user to select a video to view by providing a full-screen display of a representative frame from one scene from a program while representative frames of other scenes from the program are displayed in an overlapping manner over the full-screen frame.

With regard to the means for displaying on the screen the representative frames from multiple scenes in a program using any reduction ratio, it would also be possible to allow a user to select a video to view by displaying the representative frames of scenes from a program so that they overlap each other.

Furthermore, the reduction ratio of a selected representative frame can be changed to a different reduction ratio and played back. Thus, a user can select a representative frame and view the video at a desired size.

Not all of the representative frames (of the scenes from a program) displayed on the screen have to be reduced when displayed on the screen. It would also be possible for any one of the representative frames to be displayed full-screen without reduction. Furthermore, by playing back and displaying that stream on the screen, the contents of all or part of the stream can be understood, thus making selection easier.

The operations are the same regardless of the recording medium. For example, with disks, inconveniences resulting from different operations having to be performed for disks can be avoided.

What is claimed is:

1. Apparatus for accessing content contained on a storage medium, the content including a plurality of titles, such that each title includes a plurality of chapters and each chapter includes a plurality of frames, the titles and the chapters include information for a motion picture, further comprising plural frames, the frames organized into plural scenes, the scenes organized into plural programs, the apparatus comprising:
   a reproducing module configured to reproduce the content;
   a display module configured to display a list of plural small-frame images, each of the plural small-frame images being in correspondence to moving images;
   a driver module configured to access the content and having a driver output to produce an information signal representing the accessed content;
   a decoder module operatively coupled to the driver module to receive the information signal;
   a user input module configured to receive user input with at least a selection button and/or a cursor button; and
   a system control module configured to control the reproducing module to display the titles on a display module, wherein each of the titles is represented by single frames, and wherein the single frames, even if the single frames are unselected, are configured to be displayed in an overlapping manner,
   wherein the system control module controls the reproducing module to play back automatically a motion picture of a user-specified title at an arbitrarily-sized frame which is different from the size of a small frame used for title specification without receiving input for reproducing the user-specified title by the selection button, if there is no button input for a period of time after receiving the user-specified title selected by the cursor button,
   wherein each of the single frames represents a portion of the moving picture,
   wherein the system module further controls the driver and decoder modules to generate program identification information for each of the programs and to produce a first display signal representing the program identification information,
   wherein the system control module, in response to receiving a user-specified program selection from the user input module, controls the driver module to access a representative frame for each scene comprising the program corresponding to the user-specified program selection and controls the decoder module to produce a second display signal representing the representative frames, and
   wherein the system control module is further configured to selectively provide:
   a first control mode in which the reproducing module is configured to reproduce one moving image corresponding to a picked out one of plural small-frame images with audio in response to user instruction via the user input module and the display module configured to display the moving image reproduced in a first size without displaying other small-frame images which are not picked out, and
   a second control mode in which the reproducing module is configured to reproduce one moving image corresponding to the picked out one of plural small-frame images with audio in response to user instruction via the user input module and the display module is configured to display the moving image reproduced in a second size which is smaller than the first size overlapped with other small-frame images which are not picked out, the other small-frame images displayed with the moving image being capable of picking out for reproduction when reproducing the moving image.

2. A method for accessing content contained on a storage medium, the content including a plurality of titles, such that each title includes a plurality of chapters and each chapter includes a plurality of frames, the titles and the chapters include information for a motion picture, the method comprising:
   reproducing the content;
   displaying a list of plural small-frame images, each of the plural small-frame images being in correspondence to moving images;
   accessing the content and producing an information signal representing the accessed content;
   receiving the information signal;
   receiving user input with at least a select button and/or a cursor button;
   displaying the titles on a display module, wherein each of the titles is represented by single frames, and wherein the single frames, even if the single frames are unselected, are configured to be displayed in an overlapping manner;
   automatically playing back each motion picture of a user-specified title at an arbitrarily-sized frame which is different from the size of a small frame used for title specification without receiving input for reproducing the user-specified title by the selection button, if there is no button input for a period of time after receiving the user-specified title selected by the cursor button, and wherein each of the single frames represents a portion of the moving picture;
   generating program identification information for each of the programs;
   producing a first display signal representing the program identification information;
   in response to receiving a user-specified program selection, accessing a representative frame for each scene comprising the program corresponding to the user-specified program selection and control produce a second display signal representing the representative frames;

selectively providing:
- reproducing one moving image corresponding to a picked out one of plural small-frame images with audio in response to user instruction, and displaying the moving image reproduced in a first size without displaying other small-frame images which are not picked out, or
- reproducing one moving image corresponding to the picked out one of plural small-frame images with audio in response to user instruction, and displaying the moving image reproduced in a second size which is smaller than the first size overlapped with other small-frame images which are not picked out, the other small-frame images displayed with the moving image being capable of picking out for reproduction when reproducing the moving image.

3. The apparatus of claim 1, wherein the system control module executes the size change from the small frame to the arbitrarily-sized frame in accordance with receiving the user-specified title selected by the cursor button.

\* \* \* \* \*